Jan. 28, 1969    P. D. JOHNSON    3,424,863
LIGHT VALVE
Filed Sept. 29, 1964

Inventor:
Peter D. Johnson,
by John F. Ahern
His Attorney

United States Patent Office 3,424,863
Patented Jan. 28, 1969

3,424,863
LIGHT VALVE
Peter D. Johnson, Schenectady, N.Y., assignor to General
Electric Company, a corporation of New York
Filed Sept. 29, 1964, Ser. No. 400,102
U.S. Cl. 178—7.5          6 Claims
Int. Cl. H04n 3/16

ABSTRACT OF THE DISCLOSURE

A light valve having a solid state layer of a material that absorbs optical electromagnetic radiation in its unexcited state, and permits the passage of said radiation when in an excited energy state, the transition from one energy state to another being provided by a scanning electron beam. In another embodiment a material is used that either absorbs or transmits ultraviolet radiation, said radiation is caused to excite suitable phosphors on a remote viewing screen.

---

The present invention relates to light valves and more particularly relate to improved means for controlling the transmission of light in response to a rapidly varying control signal.

Numerous systems have been proposed for controlling or modulating the transmission of light through a light valve onto a screen in response to a rapidly varying control signal so as to enable, for example, information display or theater projection of television broadcasts. Difficulties have been encountered in such systems, particularly in that the light valves have been inadequate for one or more reasons. In particular, many previous light valves are of the "dark trace" type which produces a negative rather than a positive image while others are susceptible to rapid destruction of the image thereon by the high intensity radiation required for clear, long distance projection. Other light valves exhibit luminescence, caused by the modulated radiation, in areas required to be non-transmissive or dark. In many cases, a particularly difficult problem has been that the lifetime of the medium of the valve in the disturbed state is too long as compared to the frame repetition rate, thus causing overlap of frames on the valve. There is, therefore, a need for light valves which are not subject to these difficulties.

Accordingly, it is an object of the present invention to provide a new and improved light valve which produces a positive image, either monochromatic, multicolored or black and white.

Another object of the present invention is the provision of a new and improved solid state light valve which retains images thereon for shorter times than was previously possible.

A further object of the present invention is the provision of a new and improved system for the projection of information supplied by an electronic signal onto a viewing screen.

Briefly, in accord with a particular embodiment of this invention, I provide a light valve which comprises a solid state layer of an optically convertible material which absorbs optical electromagnetic radiation when in an unexcited or ground energy state and which may be raised by sufficient energy to an intermediate excited energy state in which it does not optically absorb the radiation. These transitions may arise from the material as a whole or from at least one component which may be included either as an impurity in a host compound or as a constituent of the compound. The transparency of the layer is controlled by pumping the material or component from the unexcited state by a cathode ray beam which supplies sufficient energy per ion to raise ions into the transmissive state to produce a desired degree of transmissivity in small regions of the valve. Particular patterns are determined through control of the electron beam by information received, for example, from an electronic signal. The light valve of the present invention modulates the passage of light from a projection lamp and the transmitted portion is passed through a conventional optical system for display on a remote viewing screen.

In accord with another embodiment of the present invention, a projection system comprises a light valve as previously described but in which the excitable material absorbs or transmits radiation in the ultraviolet region of the spectrum; an ultraviolet projection lamp; and a remote viewing screen comprising suitable phosphors which are excited by the transmitted ultraviolet radiation and accordingly produce a pattern corresponding to that produced on the light valve by a source of modulating energy. An electron beam is provided of sufficient energy for pumping the material into the intermediate state according to the operation described above. A particular advantage of this system is that materials suitable for the production of a black-and-white image may be used in the viewing screen rather than limiting the image to the color passed by the light valve.

The novel features believed characteristic of the invention are set forth in the appended claims. The invention itself, together with further objects and advantages thereof may best be understood by reference to the following description, taken in connection with the appended drawings, in which:

Figure 1:
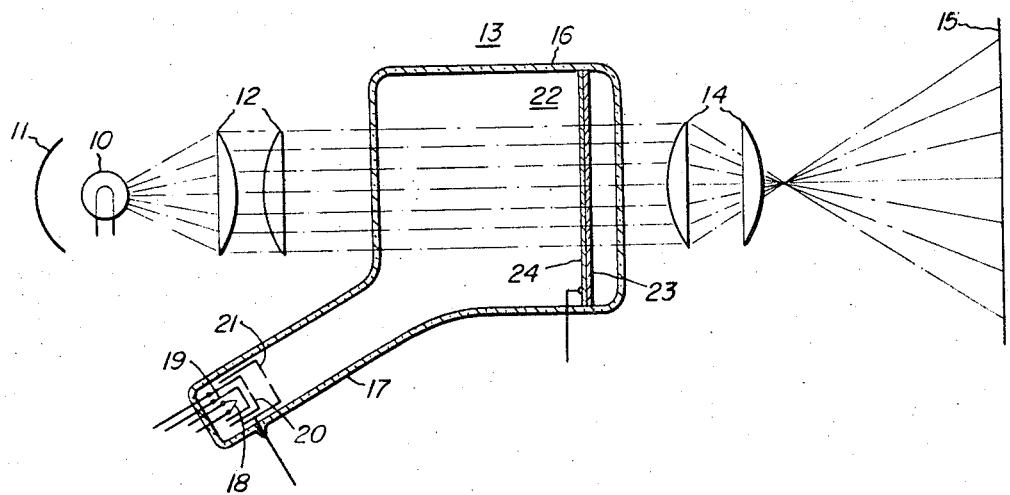
FIG. 1 is a schematic view of a projection system including a cathode ray tube embodying the light valve of the present invention.

A suitable projection system, illustrated in FIG. 1, comprises a source of radiant energy 10 and a reflector 11, a collecting lens system 12, a cathode ray tube 13, an image-forming lens system 14 and a viewing screen 15. In accord with customary projection techniques, the radiation from sources 10 and reflector 11 is collected by the lens system 12, passed through the cathode ray tube 13 wherein it is modulated and an image is formed by lens system 14 for display on the screen 15. The cathode ray tube 13 comprises an evacuated glass envelope 16 including an elongated stem portion 17 wherein the customary beam forming electrodes are contained. These may comprise, for example, a heater 18, and an electron-emissive cathode 19, an intensity control electrode 20 and a focusing electrode 21, and suitable means for connecting operating potentials to each of these elements. In addition, suitable deflection coils or yokes (not shown) may also be provided around the stem portion 17. Specific details of the apparatus thus far described may be varied in accord with conventional techniques.

The function of the electrodes 18–21 is to provide a collimated beam of electrons which scans the surface of a light valve 22 in a regular pattern, the intensity of the beam being controlled by an information-bearing signal on electrode 20 so as to produce a transparency pattern on the light valve 22 corresponding to the information to be displayed.

The present invention is directed primarily to the light valve 22 which comprises a solid state layer 23 and may have a contiguous thin transparent electrode 24 or other means of connecting an electric potential thereto. The electron beam is accelerated and attracted to the light valve by the application of a potential difference between cathodes 19 and electrode 24. The layer 23 comprises an optically convertible solid. The term "optically convertible" refers to the fact that the material, or one or more components thereof, in response to sufficient radiant energy from the cathode ray beam, undergoes a transition from a ground energy state in which it absorbs radiation of a known wavelength through a high level excited energy state to an intermediate excited energy state wherein it is transparent to the known wavelength. The active component may be included in the material as an impurity or it may be a constituent of the material as for example in the case of oxides of the transition elements.

As specific examples, a layer of ruby, the chemical formula of which is $Al_2O_3:Cr^{+3}$, or of zinc-cadmium sulfide doped with copper and chlorine, i.e. (Zn, Cd)S:Cu, Cl, are suitable for the present invention. Other materials include, for example, $Ca_3(PO_4)_2$-$CaCl_2$: $MnO_4^{-3}$; (Zn, Cd)S:Cu, Al; (Zn, Cd) (Se, S): Cu, Al; (Zn, Cd) (Se, S): Cu, Cl; (Zn, Cd)S:Mn; and (Zn, Cd)S:Pb, Cu, Cl. In the zinc-cadmium compounds and in the sulfo-selenide compounds set forth, the mole percent of either cation or of either anion may range from zero to 100%. In ruby and in Ca, $$(PO_4)_2\text{-}CaCl_2\text{:}MnO_4^{-3}$$

the chromium and manganese are the respective active components while in the other materials stated, the components act in conjunction.

The activator elements are added in amounts sufficient to control the transmissivity of the layer. For example, in the compounds set forth above, the following percentages of the various activators are sufficient.

| | Percent |
|---|---|
| $MnO_4^{-3}$ | 0.1 to 2 |
| Cu | $10^{-2}$ to $2 \times 10^{-1}$ |
| Al | $10^{-2}$ to $2 \times 10^{-1}$ |
| Mn | $10^{-1}$ to 5 |
| Pb | $10^{-3}$ to $10^{-1}$ |

Included as pure materials which are suitable for use in the present invention are NiO; CdO; $Cr_2O_3$ and $Fe_2O_3$. In each of these compounds, the transition element is the component which is excited of the cathode ray beam.

These materials and compositions are set forth by way of example and are not to be considered as limiting values. This invention is predicated upon the ability of certain materials to make transitions from absorbing energy states to transparent energy states and is not necessarily limited to those listed.

A particularly significant feature of these materials is that they remain in the transparent state for a time sufficient to allow observation and yet decay quickly enough to allow a frame repetition rate which presents a continuous smooth appearance to an observer. For example, in conventional television transmission, the frame repetition rate is 30 frames per second. If a light valve is to be feasible in such a system, each frame must accordingly decay within 0.035 sec. Many previous systems involving various types of conversion by electron beams have not been practical because they have failed to meet this requirement. The materials of the present invention, operating by pumping to a high level, partial rapid decay to an intermediate transmissive level and final decay to an absorbing ground state are found to have decay times suitable to accomplish this result.

More specifically, in information display apparatus, the duration of a frame presented as part of a continuous sequence should be at least $10^{-4}$ second to permit the human eye to record it and to avoid discontinuity. On the other hand, a new frame must be presented within $10^{-1}$ second to prevent individual recognition of the frames. Accordingly, the ions should remain in the intermediate level for a time in the range of $10^{-4}$ to $10^{-1}$ second. This range defines a time just sufficient for transmission through the valve to be observed by the human eye. In other systems, such as television projection, the frame repetition speed and the degrees of contrast and of brightness must be controlled so as to present scenes as they normally appear to the eye. In this case, the range is limited to 0.01–0.035 second. The upper limit is determined by the reciprocal of the minimum frame repetition rate for continuous presentation.

Figure 2:
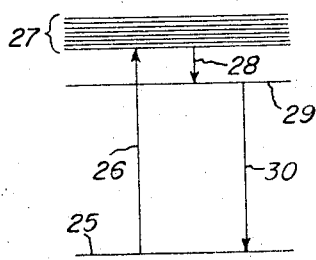
FIG. 2 is a schematic representation of the energy level system of a material which may be used in the light valve of the present invention.

An energy level diagram typical of such materials is shown in FIG. 2. In the case of a ruby layer, for example, this would be the energy level diagram of the chromium ion. In more complex instances, where several or all components are involved, FIG. 2 represents the effective energy level system for the overall material. The ions normally exist in an energy level 25, known as the ground state. Upon pumping by a suitable energy source of sufficient strength, the ions are excited and undergo a transition 26 into one of the plurality of states indicated generally at 27. The lifetime of the ions in this state is extremely short, on the order of $10^{-6}$ seconds, and the ions therein almost immediately undergo a transition 28 to intermediate excited state 29. In this state, the lifetime is comparatively long, on the order of $2.5 \times 10^{-3}$ seconds, and the ions remain there, on the average, for that length of time. The ions then undergo transition 30 and thus return to the ground energy level 25.

It has been found that many materials have similar energy level diagrams and undergo these transitions, including those listed above.

These materials absorb energy of a particular wavelength when in the ground state 25 but do not absorb it when they are in the intermediate excited state 29. That is, they are opaque to the transmission of such wavelengths when in the ground state and are transparent to the transmission of the wavelength when in the excited state 29.

The light valve of the present invention functions by virtue of this difference. The cathode ray beam is supplied with energy sufficient, in terms of the energy-per-ion required in the particular material, to raise the material into the excited states 27 from which they fall, almost immediately, into the intermediate state 29. To accomplish modulation of the transmissivity of the layer, the electron beam scans the light valve 22 in a conventional raster pattern and the intensity of the electron beam is controlled in accord with an input signal. In the regions where light transmisison is desired, large numbers of the active centers in the material are pumped by the cathode rays into the intermediate energy level 29 by way of the levels 27. In the regions where transmission is not wanted, the intensity of the electron beam is reduced so that essentially no active centers are pumped out of the ground state 25. There they continue to absorb and the region accordingly remains opaque. Varying degrees of transmissivity between the extremes may of course be obtained by appropriate modulation of the electron beam intensity.

The solid layer 23, comprised of any of the above described materials, for example, is a solid homogeneous body which may be prepared, for example, by evaporation or chemical deposition onto the transparent electrode 24. For maximum modulation of light intensity and ease of operation, the layer should be of a thickness comparable to the penetration depth of the cathode rays. This is generally in the range of 0.5 to 2 microns although higher voltages increase the permissible maximum up to about 5 microns.

In the case of certain other suitable materials, level 29 comprises a number of traps at impurity atom locations where ions are bound for a period of time. These materials include, for example Cl, Br, Al, Ga, In and O. Such materials may be used to advantage when it is desired to lengthen the time constant of the light valve transmission as for instance for radar display or other technical applications.

The radiant energy delivered by the electron beam to the light valve is of a value sufficient, as previously indicated, to raise the material from level 25 into the region of levels 27. In the case of ruby, this is approximately 3 electron volts per chromium atom. This energy is supplied by accelerating the electron beam across a potential difference of the order of 15,000–20,000 volts.

This potential is applied between cathode electrode 19 and transparent electrode 24 so that electrons impinging on the light valve have sufficient energy to cause the transition from level 25 to level 27. The electron beam is developed by applying a suitable potential to heater element 18 causing the emission of electrons from cathode 19. The beam intensity is controlled by electrode 20, accelerated by electrode 24 and focused by electrode 21. Scanning is controlled by the deflection yokes (not shown). This portion of the apparatus of FIG. 1 is conventional and well known and variations from the operation just described may be made.

In the case of the ruby light valve previously mentioned, the valve is respectively transparent or opaque to two ranges of wavelength, 3800–4200 angstrom units and 5200–5800 A., both in the visible spectrum. Accordingly, a projection lamp of the type commonly known in other types of projectors with suitable filters to select either of these ranges may be used for light source 10, lenses suitable for visible light may be used and the screen 15 may comprise a conventional display surface.

A particularly advantageous system may be provided in accordance with the present invention if the material used as light valve 22 is zinc-cadmium sulfide activated with manganese. The composition should contain zinc and cadmium in a ratio of 4:1 and should include about 0.1% manganese. In this case, the wavelength to which the valve is respectively transparent opaque is approximately 3650 angstrom units, in the ultraviolet region. This wavelength is easily produced by a source such as the H-4 high pressure mercury black light lamp manufactured by the General Electric Company. This wavelength excites phosphors which can produce a black-and-white image or image of any cleared color. Specifically, zinc sulfide activated with 0.05% silver plus zinc-cadmium sulfide activated with 0.05% silver, where the zinc-cadmium ratio is about 2:3, provide a black-and-white image. A particular advantage is that this system is not limited to the color transmitted by the layer 23. Also, if such an ultraviolet lamp is used, and the layer is composed of the indicated active element, a very high intensity image may be disposed a long distance away and still receive sufficient ultraviolet energy so as to produce a clear, visible image of the information when the phosphor luminescence under the ultraviolet radiation.

Figure 3:
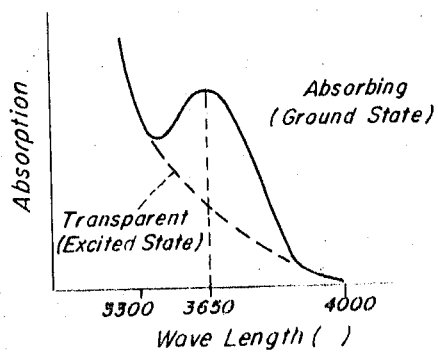
FIG. 3 is a graphical representation of the absorption spectrum of a particular material suitable for use in the present invention.

For such a system utilizing (ZnCd)S:Cu, Cl, the energy supplied to the active element must be approximately in the range of 1.8 to 3.0 electron volts. FIG. 3 illustrates the absorption spectra of this material in the neighborhood of 3650 angstrom units. The respective curves, as marked thereon, indicate the absorbing and transmissive states. The transmission ratio depends on layer thickness and can be made to be approximately 25 to 50, thus enabling sharp contrast to be obtained.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A light valve for controlling the transmission of a beam of electromagnetic radiation to impart image containing information to the beam comprising a layer of a solid state optically convertible material which is non-transmissive to said beam in its unexcited state, said material including an activator impurity which induces therein an intermediate energy level in the energy level structure thereof permitting incident electrons to convert said material from a radiation-absorbing condition to a radiation-transmissive condition by virtue of a transition from a ground energy state to an excited energy state; said material remaining in said transmissive condition for a time greater than $10^{-4}$ second; means providing an electron beam of sufficient energy to convert said material; and means in electrical contact with said layer for conducting a potential thereto.

2. A light valve as claimed in claim 1 wherein said optically convertible material remains in said transmissive condition for a time in the range of 0.01 to 0.035 second.

3. A light valve as set forth in claim 1 wherein said layer of a solid state optically convertible material has a thickness in the range of 0.5 to 5 microns.

4. Apparatus for producing an image on a viewing screen in correspondence to an information-bearing signal comprising a viewing screen comprising a planar layer of ZnS:Ag and ZnCdS:Ag responsive to ultraviolet radiation in the range of 3500–3700 A.U.; and a light valve disposed intermediate a source of said ultraviolet radiation and said screen and responsive to incident electrons for modulating the transmission of said radiation to said screen, said light valve comprising a layer of a solid state optically convertible material, said material including an activator impurity which induces therein an intermediate energy level in the energy level structure thereof permitting incident electrons to convert said material from a radiation-absorbing condition to a radiation-transmissive condition by virtue of a transition from a ground energy state to an intermediate excited energy state; said material remaining in said transmissive condition for a time greater than $10^{-4}$ second and comprising (Zn, Cd)S:Mn; means providing an electron beam of sufficient energy to convert said material; and means in electrical contact with said layer for conducting a potential thereto.

5. A light valve for controlling the transmission of a beam of electromagnetic radiation to impart image containing information to said beam and comprising a layer of solid state optically convertible material which is non-transmissive to said beam in its unexcited state, said material including an activator impurity which induces therein an intermediate energy level in the energy level structure thereof permitting incident electrons to convert said material from a radiation-absorbing condition to a radiation-transmissive condition by virtue of a transition from a ground energy state to said intermediate excited energy state; said material remaining in said transmissive condition for a time greater than $10^{-4}$ second and being selected from the group consisting of $Al_2O_3:Cr^{+3}$; (Zn, Cd)S:Cu, Cl; $Ca_3(PO_4)_2CaCl_2:Mn_4^{-3}$; (Zn, Cd)S: Cu, Al; (Zn, Cd)(SeS):Cu, Al; (Zn, Cd)(SeS):Cu, Cl; (Zn, Cd)S:Mn; and (Zn, Cd)S:Pb, Cu, Cl; means providing an electron beam of sufficient energy to convert said material; and means in electrical contact with said layer for conducting a potential thereto.

6. A light valve as claimed in claim 5 wherein said optically convertible material comprises $Al_2O_3:Cr^{+3}$.

References Cited

UNITED STATES PATENTS

| | | | |
|---|---|---|---|
| 2,169,838 | 8/1939 | Herbst | 178—7.87 |
| 2,281,637 | 5/1942 | Sukumlyn | 350—160 |
| 2,290,581 | 7/1942 | Donal | 178—7.5 |
| 2,335,659 | 11/1943 | Franenckel | 350—160 |
| 2,411,155 | 11/1946 | Gorn | 178—7.87 |
| 2,445,774 | 7/1948 | Gorn | 178—7.5 |
| 2,481,621 | 9/1949 | Rosenthal | 178—7.87 |
| 3,218,390 | 11/1965 | Bramley | 250—199 |

ROBERT L. GRIFFIN, *Primary Examiner.*

J. A. ORSINO, *Assistant Examiner.*

U.S. Cl. X.R.

178—7.87; 307—311; 313—91; 350—160